United States Patent Office 2,976,788
Patented Mar. 28, 1961

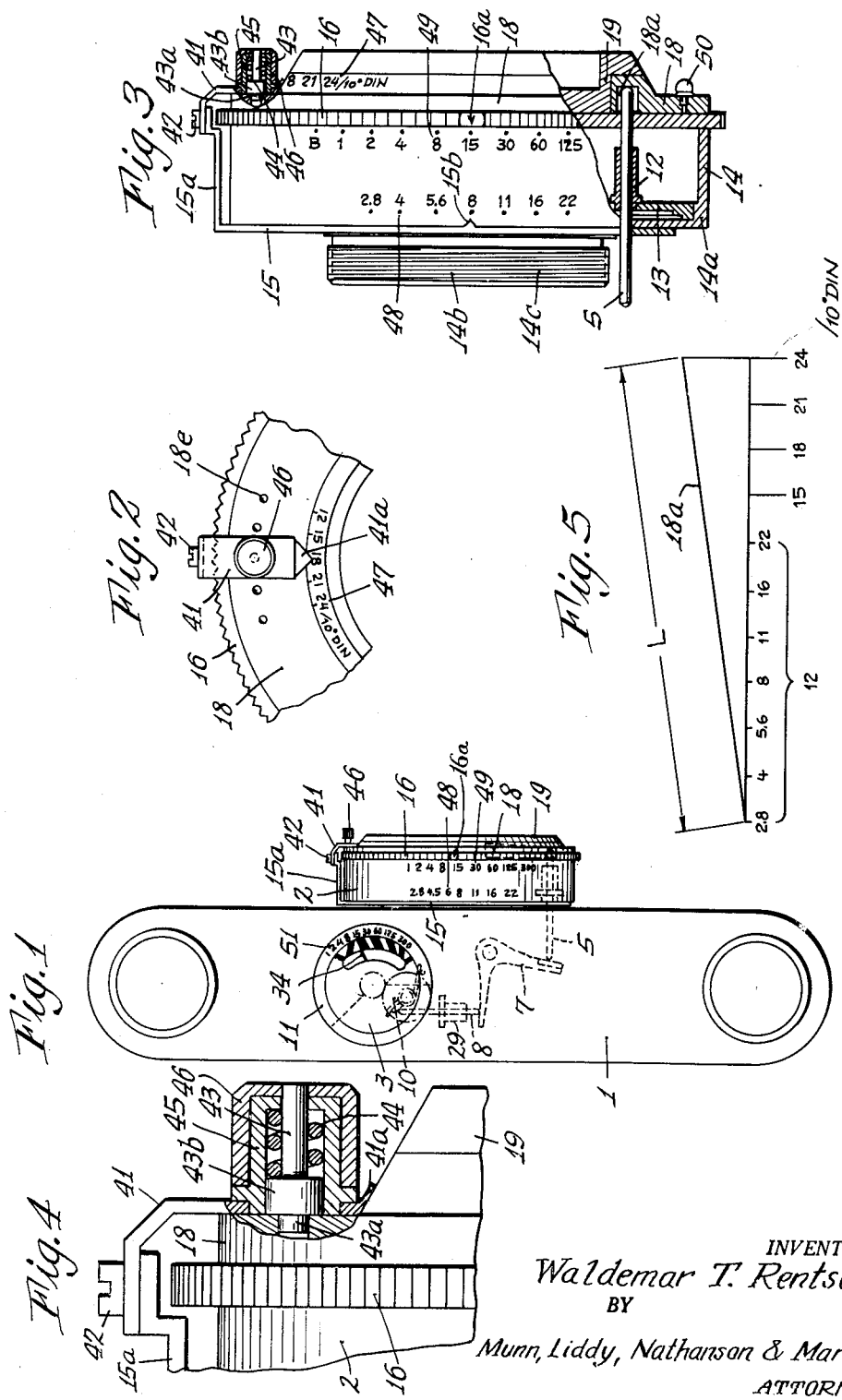

2,976,788

PHOTOGRAPHIC INTRA-LENS SHUTTER WITH COUPLED EXPOSURE METER

Waldemar T. Rentschler, Calmbach (Enz), Germany, assignor to Alfred Gauthier G.m.b.H., Calmbach (Enz), Germany, a corporation of Germany Filed Sept. 26, 1956, Ser. No. 612,190

Claims priority, application Germany Oct. 15, 1955

3 Claims. (Cl. 95—10)

This invention relates to photographic intra-lens shutter structures and cameras of the type having light-responsive exposure indicators or meters. The invention concerns improvements in the shutter structure disclosed and claimed in my copending application Serial No. 593,134 filed June 22, 1956, and entitled "Photographic Intra-Lens Shutter and Coupled Exposure Device."

My application above referred to discloses a photographic intra-lens shutter and coupled exposure meter, where there is a turnable or shiftable part projecting into the interior of the shutter structure and extending parallel to the shutter axis, said part being operably connected with and actuated by a setting ring which controls certain conditions of exposure. Such setting ring, for example, may be the diaphragm setting ring or the exposure time setting ring of the shutter.

Where, as in my application referred to, the movable part is axially shiftable, an advantage is obtained in that an adjustable cam ring may be located between the exposure time setting ring and the front plate of the shutter, such cam ring shifting the said part axially and in a direction parallel to the shutter axis in a very simple and effective manner, to actuate the exposure indicator. Also, in the device of my copending application, the exposure indicator includes a settable member actuated by the said axially-shiftable part and having a film sensitivity scale, and also includes a shiftable ring having a second scale for exposure times or diaphragm openings.

With this prior organization there is effected a very simple, reliable and compact organization, with all of the parts for coupling the shutter and exposure indicator or meter located within the shutter housing or camera housing carrying the meter. Therefore, a closed appearance of the camera is obtained, which is especially advantageous where the exposure indicator or meter is completey mounted within the camera housing in the well known manner.

With this organization, however, at the upper side of the cover or housing of the camera it is necessary to have, besides the window for inspecting the instrument pointer of the meter, at least one opening or aperture to enable the shiftable ring of the indicator to be manually actuated for the purpose of adjusting for the film sensitivity. In certain circumstances it may be considered undesirable to provide such an uncovered opening in the camera housing, since such opening may permit dirt and dust to penetrate into the interior of the camera. With the device of my application above identified, it is not thought to be feasible to eliminate this opening by which there is made possible the actuation of the said ring of the exposure indicator.

The above drawback of my prior construction is obviated by the present invention, and an object of this invention is to provide a novel and improved intra-lens shutter and coupled exposure indicator or meter, wherein there is eliminated entirely all openings, apertures, etc., which were heretofore necessary to adjust the exposure indicator for different film sensitivities.

In accomplishing this in accordance with the invention, I provide for adjustment as to film sensitivity by incorporating an adjustable, releasable coupling device through which there is effected the simultaneous movement of the ring which alters the conditions of exposure and the cam ring which effects actuation of the exposure indicator. Such adjustable, releasable coupling enables the said rings to be placed and to be rigidly coupled with each other in different relative positions.

Further, in accordance with the invention, I provide on one of said rings a film sensitivity scale and carry on the other ring a setting or index mark cooperating with said scale.

The said releasable coupling means is effected in a novel and advantageous manner by the use of a plurality of spaced notches or indentations, the spacings of which correspond to the divisions of the film sensitivity scale.

In the drawings accompanying this specification, similar characters of reference indicate corresponding parts wherever possible in the several views, in which:

Figure 1 is a top view of a camera with intra-lens shutter and exposure indicator, made in accordance with the invention; Fig. 2 is a front elevational view, enlarged, of a portion of the shutter structure of Fig. 1, illustrating the adjustable, releasable coupling means between the cam ring and the ring by which the conditions of exposure may be altered; Fig. 3 is a view partly in side elevation and partly in axial section, enlarged, of the intra-lens shutter structure of the camera; Fig. 4 is a view, greatly enlarged, partly in section and partly in elevation, of a portion of Fig. 3, revealing more clearly the details of construction; and Fig. 5 is a diagram, similar to a pattern, of the cam carried by the cam ring which actuates the exposure indicator.

As shown, the numeral 1 indicates generally a photographic camera, having an intra-lens shutter 2 mounted in the well known manner, and having a known type of exposure indicator or meter 3 carried by the camera housing.

As with the device of my copending application identified above, there is a shutter housing 14 having a bottom wall 14a provided with a nozzle 14b in which the usual lenses may be mounted. The nozzle 14b has external threads 14c which the shutter may be attached to the camera housing 1.

Disposed at the rear of the shutter structure 2 there is a diagram setting ring 15, and in the front of the shutter structure there is an exposure time setting ring 16, both said rings being turnable and adjustable to effect respectively different diaphragm openings and different shutter speeds.

Within the shutter housing 14 there is disposed a base plate 13 having a guide bushing or bearing 12 in which a cylindrical pin 5 is axially shiftable parallel to the axis to the shutter. The rear extremity of the pin 5 engages a bell crank or lever 7 which in turn drives an axially shiftable pin 8 mounted in a guide bushing 29 and actuating a spring-biased transmission gear 10 by which there is effected adjustment of a ring 11 having a scale 51 on which shutter speed values are given.

The foremost end of the pin 5 rides on a cam 18a which is carried by the cam ring 18. As shown, the ring 18 is supported between the exposure time setting ring 16 of the shutter and the front plate 19 thereof.

In my above referred to application, the cam ring 18 is described as being connectable either to the diaphragm setting ring 15 or to the exposure time setting ring 16, such connection being permanent, non-releasable and non-adjustable.

However, in accordance with this invention, the exposure cam ring 18 is now releasably and adjustably coupled with one of said rings, in the present instance the coupling being effected to the diaphragm setting ring 15.

It will be understood that either of the rings 15 or 16 may effect an alteration in the conditions of exposure, and while the coupling of the cam ring 18 is made to the setting ring 15, the invention is not limited to such specific connection.

By the present invention, such coupling enables the cam ring 18 to have different relative positions with respect to the diaphragm setting ring 15 while at the same time being simultaneously movable therewith, and the said different relative positions may be coordinated with a suitable film sensitivity scale whereby adjustment as to different film sensitivities may be had by variably positioning the said rings with respect to each other.

As shown, the diaphragm setting ring 15 has a forwardly extending arm 15a carrying at its foremost end an inwardly bent extension 41, such extension being secured in place by, for example, a screw 42.

The extension 41 movably mounts a pin 43 which is shiftable axially against the action of a helical spring 44. One end 43a of the pin 43 is receivable in recesses or notches 18e provided in the front side of the cam ring 18. The pin 43 has a shoulder 43b constituting an abutment for engagement by the spring 44, whereby the pin 43 is normally urged rearward to maintain the extremity 43a thereof in one or another of the recesses 18e. The pin 43 is carried by a bearing bushing 45 fixed to the extension 41, and for the purpose of pulling the pin 43 forward to disengage it from a recess 18e there is provided on the pin a knurled knob 46, which covers the bearing bushing 45.

Also, on the conical outer front surface of the cam ring 18 there is provided a film sensitivity scale 47 the graduations of which are coordinated with the recesses 18e of the cam ring, such scale being traversible by a pointer or index mark 41a carried by the extension 41.

In order to enable the adjustable coupling between the rings 18 and 15 to be effective for the purpose of adjusting the different film sensitivities, the cam 18a of the cam ring 18 is lengthened, as compared with the cam disclosed in my above identified application. Such lengthening is so arranged as to correspond to the scale 47 and the markings thereon, as may be understood. In Fig. 5 there is shown a diagram or pattern for the cam 18a, the length L thereof corresponding to shifting of the range for the diaphragm from 2.8 to 22 and shifting of the range for film sensitivities from 12 to 24/10° DIN.

Also, in place of the notched coupling including the recesses 18e as illustrated, any other suitable coupling such as an effective friction coupling might be provided, wherein there may be faclitated adjustment of the film sensitivity between settings 12 and 24/10° DIN.

Moreover, the film sensitivity scale 47 could be provided on either the diaphragm setting ring 15 or the exposure time setting ring 16, in which case the cam ring 18a would carry the setting or index mark.

The manner of adjusting for a proper exposure setting, by means of the exposure indicator, is carried out in much the same way as described in my application referred to. Considering the procedure in connection with my copending application, it is only necessary in the present instance to exchange the exposure time and the diaphragm. Thus, in the present embodiment of the invention the desired exposure time may first be established by adjustment of the exposure time setting ring 16. In this conncetion, a scale 49 provided on the shutter housing 14, cooperating with an index mark 16a on the setting ring 16, is employed.

The diaphragm opening coordinated to the preselected exposure time and as determined by the existing light conditions is now adjusted, by grasping an actuating knob 50 on the cam setting ring 18 and turning the latter and the diaphragm setting ring 15, to cause the tracing member 11 and scale 51 thereof to shift so as to bring the selected shutter speed value which appears on the scale 51 into coincidence with the pointer or movable indicator 34 of the exposure indicator 3. Such value is attained from the pointer 34 of the indicator, through a usual type of channel scale referred to the scale 51 carried by the exposure meter tracing member or disk 11, which latter is automatically adjusted in response to turning of the cam ring 18 and diaphragm setting ring 15. Or, by means of the scale 48 it is possible to preselect a certain diaphragm setting and, since the scale 51 is calibrated in shutter speed values as shown, to read off the corresponding exposure time or shutter speed from the exposure indicator, where such exposure time is not preselected. Then, the speed setting member 16 is set by means of the scale 49 to the shutter speed as read at the meter 3.

In accordance with this invention, when a film of different sensitivity is used in the camera, adjustment may be made for the same by releasing the coupling pin 43 from one of the recesses 18e and shifting the extension 41 and 41a over the scale 47 until the corresponding sensitivity value is indicated. The pin 43 is then released into the proper recess 18e, whereupon the rings 18 and 15 are again rigidly coupled to each other.

In Figure 1 the setting or index mark 16a of the speed setting ring 16 is in coincidence with the number "15" of the exposure time scale 49. This means that the shutter is set on an exposure time of 1/15 sec. The same number "15" also is on the scale 51, which latter is identical to the exposure time scale 49 and is arranged on the setting disk or tracing member 11 of the exposure meter 3; in Figure 1 the number "15" is in coincidence with the measuring device indicator 34, the position of which is determined by the prevailing illumination conditions. This setting of the disk 11 is made by means of cam ring 18 which, on the one hand, is connected by means of the transmission devices 5, 7, 9, 10 with the meter setting disk 11 and, on the other hand, with the diaphragm setting ring 15 of the shutter. The set diaphragm value is now properly adjusted, and can be read on the firmly fixed scale 48 with the help of the mark 15b. In the present case, the diaphragm aperture corresponding to the set exposure time of 1/15 sec., due to the prevailing illumination conditions, has the value 8.

By means of the exposure meter 3 a semiautomatic exposure setting in another manner can be made, by first using the scale 48 to preset a certain diaphragm value, after which the corresponding exposure time is read on scale 51 by means of the measuring device indicator 34 and then is set on the shutter with the ring 16, by means of mark 16a and exposure time scale 49.

It will be understood that, in place of the coupling between the cam ring 18 and the diaphragm setting ring 15, a similar coupling may be effected between the cam ring 18 and the exposure time setting ring 16, and then the scale 51 would be provided with diaphragm values, similar to those on the scale 48.

By means of the above mentioned relative adjustment of ring 18 with respect to the diaphragm setting rings 15, when adjustment is made for a new film sensitivity another exposure time value on scale 51 of disk 11 will be brought into coincidence with the measuring device indicator 34 of the exposure meter. For example, in the event that on the shutter according to the illustrated embodiment an alteration of the speed of the film is made from the shown 18/10° DIN to 21/10° DIN; on scale 51 the number "30" would be in coincidence with the measuring device indicator 34. Now, in order to obtain again the exposure time value "15" on the shutter, it is required to turn cam ring 18 and with this diaphragm setting ring 15 until the measuring device indicator 34 points again to the number "15" of scale 51. Now the diaphragm will be set to the next lowest value, namely value "11."

It will be understood from the foregoing that, by the provision of the accessible, adjustable coupling device between the rings 15 and 18 there is eliminated all necessity for through openings in the camera 1 at the exposure indicator 3, such as were employed in the device of my copending application. Therefore, the camera housing 1 may be completely closed and air tight, preventing access of dirt, dust and the like to the interior of the camera. Moreover, with the above organization not only is the setting scale 48 for the diaphragm and the scale 49 for the exposure time readily visible at the shutter, but also there is visible at the same place the setting scale 47 for film sensitivity.

Variations and modifications may be made within the scope of the claims and portions of the improvements may be used without others.

I claim:

1. In a photographic camera, in combination, an intra-lens shutter structure; a shutter housing for said structure; an adjustable setting ring concentric with and rotatable relative to said housing, said ring being turnable to alter an exposure factor; a light-responsive exposure indicator carried by the camera, having a movable and adjustable tracing member and a movable indicator member separate from said tracing member and cooperable therewith, said exposure indicator including scale means associated with the indicator member and tracing member and calibrated in values of another exposure factor; a turnable cam ring in said shutter housing; means disposed partially within said housing, coupling the cam ring to said tracing member of the exposure indicator to operate the tracing member; another setting ring rotatable with respect to the said housing, for altering said other exposure factor, said other setting ring being independent of the tracing member and of the first-mentioned setting ring; and adjustable, releasable coupling means including a member disposed exteriorly of said housing, connecting said cam ring and first-mentioned setting ring for simultaneous turning movement, said coupling means providing for coupling of the said rings in different relative positions to take into account still another exposure factor.

2. The invention as defined in claim 1 in which there is means providing a film sensitivity scale on one of said coupled rings to be movable therewith, and in which there is means providing an index mark on the other of the coupled rings for movement therewith, said scale means and index mark means being cooperable with each other and representing the last-mentioned exposure factor.

3. The invention as defined in claim 2 in which the said coupling means comprises a member provided with a plurality of notches having spacings related to the divisions of said film sensitivity scale, and further comprises a spring-biased movable member carried by one of the coupled rings and receivable in said notches.

References Cited in the file of this patent

UNITED STATES PATENTS

| | | |
|---|---|---|
| 2,199,464 | Kuppenbender et al. | May 7, 1940 |
| 2,209,156 | Fischer | July 23, 1940 |
| 2,340,622 | Simmon | Feb. 1, 1944 |
| 2,596,328 | Dorsey | May 13, 1952 |

FOREIGN PATENTS

| | | |
|---|---|---|
| 756,282 | Germany | Feb. 23, 1953 |